Dec. 12, 1961 E. P. G. WRIGHT 3,013,251

DATA PROCESSING EQUIPMENT

Filed Nov. 8, 1957 2 Sheets-Sheet 1

FIG. I.

Inventor
E. P. G. Wright
By [signature]
Attorney

Dec. 12, 1961 E. P. G. WRIGHT 3,013,251
DATA PROCESSING EQUIPMENT
Filed Nov. 8, 1957 2 Sheets-Sheet 2

Inventor
E. P. G. Wright
By [signature]
Attorney 3,013,251
DATA PROCESSING EQUIPMENT Esmond Philip Goodwin Wright, London, England, assignor to International Standard Electric Corporation, New York, N.Y., a corporation of Delaware Filed Nov. 8, 1957, Ser. No. 695,363
Claims priority, application Great Britain Dec. 18, 1956
5 Claims. (Cl. 340—172.5)

This invention relates to improvements in or relating to data processing equipment.

According to the invention there is provided a "ferric" coder for issuing any one of a number of codes, each code of which corresponds to a predetermined item of intelligence comprising a plurality of code stores in co-ordinate array, each store consisting of a row of "ferric" cells equal in number to the number of elements in the code, and wherein the corresponding cells in each row constitute a column, said columns equal in number to said cells in a row, a row wire per row, a column wire and an output wire per column, writing equipment per column wire, reading equipment per output wire, common equipment for scanning said row, column and output wires, said reading and writing equipment associated with said scanning equipment, control equipment common to all columns of cells, combined recording and transferring equipment individual to each column of cells and associated with said reading and writing equipment of the column, a plurality of storage equipments per column of cells, and means for applying a signal to cause the elements of the code stored in a row of cells corresponding to a particular item of intelligence to be read, recorded and transferred into said storage equipments and re-written into said row of cells.

The invention is illustrated in the accompanying drawings, in which.

Figure 1:
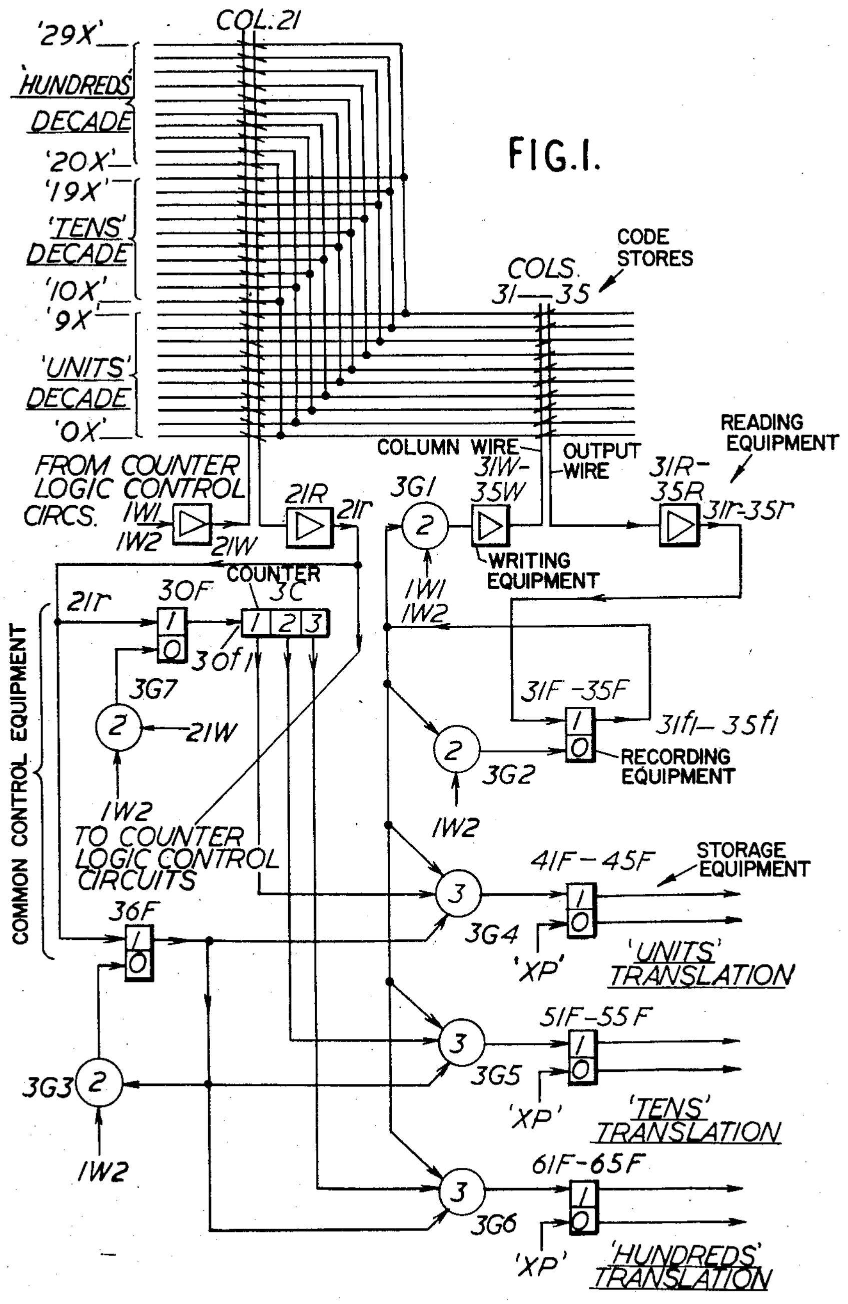
FIG. 1 is a schematic diagram of a circuit embodying the invention.

In my co-pending application Serial No. 701,767, filed December 10, 1957, there is described a single column "ferric" store acting as a counter capable of counting from "000" to "999," and it is one of the purposes of the invention described herein to translate the number indicated by the counter into a multi-element telegraph, binary or some other code at the time of "reading" the number. Such a store is shown in FIG. 1 of the accompanying drawings, and which may, in this example, be constituted by one or more ferro-magnetic blocks having a total of thirty holes, the material around each hole forming what is hereinafter referred to as a digit cell. Each of these cells is represented in FIG. 1 by the crossing point of a horizontal line and a short line at an incline to the horizontal. Thus the two vertical lines designated "Col. 21" represent a column of thirty cells, and the two vertical lines designated "Cols. 31–35" represent a column of ten cells. Dependent on their state of magnetisation, such cells may be either in a "0" or "1" condition. In a positively magnetised state, a cell is set to the "0" condition, whilst when in a negatively magnetised state, it is set to a "1" condition. The thirty cells designated "Col. 21" form a single column store and are divided into three groups of ten cells which represent "units," "tens" and "hundreds" decades, respectively, such that the column as a whole may function, for example, as a three decade decimal counter, capable as previously stated, of counting from "000" to "999." The first to the tenth cells inclusive of each decade are representative of a digits value from "zero" to "nine," and it is so arranged that only one cell per decade is in the "1" condition at any time. Such a condition will be representative of the "digit" value of its particular decade. Thus a "1" condition in the last cells of each decade would be representative of the number "999," whereas a similar condition in the first cells of each decade would be representative of "000." The processes of "counting," "zeroising" and carrying from "units" to "tens," and "tens" to "hundreds" decades are accomplished by the use of an access selector (not shown) which, in response to an external counting signal applies a series of half-read/half-write pulses, designated 1W1 and 1W2 respectively, to each of the row wires threading the cells of a column, in an irregular sequence; and which for each row wire pulsed, there is simultaneously applied via writing amplifier 21W, a similar series of half-read/half-write pulses to the column wire threading all the cells of the column. These pulses are part of a single wave form shown at the top of FIG. 2. The positive portions of this waveform represent the half-read pulses 1W1, while the negative portions represent the half-write pulses 1W2, the successive pairs of 1W1 and 1W2 pulses being designated as 22X, 23X, etc. The application of these pulse series enables the digits representing the number stored in the cells of the column to be "read" via the output conductor by the output amplifier 21R which causes a trigger to conduct as a "1" condition is read from a cell, this trigger in conjunction with logic control circuits, not shown, allows the setting of all three decades to be changed in steps of "1" from "000" to "999." The sequence in which the cells of each decades are scanned, i.e. pulsed by the 1W1/1W2 series is as follows:

Units decade: Cells on rows "0X" to "9X" followed by "0X" again

Tens decade: Cells on rows "10X" to "19X" followed by "10X" again

Hundreds decade: Cells on rows "20X" to "29X" followed by "20X" again.

The half-read pulses are of positive polarity and once applied to a cell which is in the "1" condition sets it to a state of positive magnetisation, i.e. the "0" condition. It follows then, that the content of a cell in the "1" condition is destroyed when "read." If it is required to re-write the condition in the cell immediately after it has been read, it is necessary to follow the positive half-read pulses by negative half-write pulses. There are certain conditions during the counting cycle that make this immediate re-writing necessary, such as when the "1" condition in any of the "tens" or "hundreds" decades is not to be advanced. However, delay in writing is always necessary if it is required to advance the number by a "units," "tens" or "hundreds" digit value of "1." It must be understood at this juncture that the rows are scanned only once in the order described for each exterior counting pulse received.

It is by the irregular sequence of scanning described, in conjunction with the logic control circuits, that a "1" condition read from the nine cell on rows "9X," "19X," and "29X" may be "zeroised," that is to say re-written in the "zero" cell on rows "0X," "10X," or "20X" respectively when it is required to do so. Each time a counting signal is received, the "1" condition read from a cell in the "units" decade is re-written in the next successive cell to be scanned; thus adding "one" to the number. It follows then that when the digit in the "units" decade has advanced from the "zero" cell on row "0X," to the "nine" cell on row "9X," it is re-written in row "0X" which is the next row to be scanned, and the digit in the "tens" decade is advanced by one cell to achieve a "carry" as the scanning cycle proceeds. Similarly each time a "1" is "read" from the "nine" cell of the tens decade on row "19X," it is re-written in row "10X" and the "digit in the hundreds" decade is advanced by one cell to indicate a "carry" as that decade is scanned. However, in the case of the "hundreds" decade, re-writing in the "zero" cell on row "20X" only takes place when the total "read" from all three decades during the access selection cycle is "999."

There has also been described in the same copending patent application, a number of single column counters not used simultaneously and in which the logic control circuits, scanning means and row wires for one counter are common to all counters and wherein there is a separate start trigger and switch for each counter, whereby only one counter is connected to the common equipment at a time. It will be seen that the coder described herein can operate with any one of such counters as may be connected to the common equipment.

The coder now to be described with reference to FIG. 1, is constituted by a co-ordinate array of "ferric" cells arranged in rows and columns. The term "ferric" embraces both ferro-electric and ferro-magnetic materials. In this example the description of operation of the coder is directed to stores using ferro-magnetic cells. Such an array of cells may be constituted by a number of individual toroids of the material, or by a number of blocks of the same material having series of holes therein, the material around each hole in this case constituting the cell. The coder consists of a translating matrix which comprises ten rows of cells arranged in five columns designated 31 to 35. For the sake of clarity, only one column has been shown; since the operation of each column with respect to its appendant triggers during the translation and storage processes is the same. It will be readily understood that as there are five columns of cells, each row will consist of five cells, which due to their initial setting are representative of the five elements of the code of the digit concerned. It will be seen from FIG. 1 that the ten rows are threaded by half-read/half-write conductors "0X" to "9X." The cells in row "0X" are set so that the conditions of the five elements stored therein are representative of the particular code used for "zero" or "0," whereas those in rows 1X to 9X are set so that they may be representative of the code for numbers "1" to "9." The rows, as well as being threaded by half-read/half-write conductors "0X" to "9X" are also threaded by half-read/half-write conductors "10X" to "19X" and "20X" to "29X" respectively i.e., row "0X" is pulsed by row wires "0X," "10X," "20X," whilst row "1X" is pulsed by row wires "1X," "11X" and "21X" and so on.

Each column has a separate half-read/half-write conductor, called the column wire, from an amplifier such as 31W over which are pulsed half-read/half-write waveforms 1W1 and 1W2, simultaneously with the half-read/half-write wave-forms 1W1 and 1W2 applied in an irregular sequence over row wires "0X" to "29X" thus enambling the contents of the cells in any row to be "read" via the output conductor and output amplifier 21R, and the conditions so "read" to be re-written back into them immediately or with a delay via the logic control triggers.

If required, the output conductors of each column could be dispensed with; in such a case, the respective column wires would be common to both the amplifiers such as 21W and 21R of the columns without affecting the processes of reading and writing.

This system of pulsing enables each of the ten rows of the translating matrix to be scanned three times by wave-forms 1W1 and 1W2 for each cycle of the access selector during which all the cells in the rows of column 21 of the counter are scanned once, with the exception of rows "0X," "10X" and "20X," which are scanned twice, the reason for which has already been explained with regard to dealing with the "zeroising" and "carrying" from the "units" to "tens" and "tens" to "hundreds" decades. Although row "0X" of the translating matrix will be scanned six times instead of three during one cycle of the access selector, this extra scanning does not in any way affect the translation process. This will become obvious later in the description.

Each time the "units," "tens" and "hundreds" decade groups of cells of the counter are scanned, i.e., those in rows "0X" to "9X," "10X" to "19X" and "20X" to "29X" rows "0X" to "9X" of the translating matrix will be scanned. When a "1" condition is read from a cell in the "units," "tens" or "hundreds" decade of the counter, indicating the "units," "tens" or "hundreds" digit of the decimal number, the equivalent code for that particular digit is being read from the five cells of the row in the translating matrix which is served by the same row wire as the row from which "1" is being read from the counter. Columns 31 to 35 have a number of triggers, such as 31F to 35F, 41F to 45F, 51F to 55F, and 61F to 65F respectively, whilst triggers 36F and counter 3C are common to all columns.

It is the purpose of trigger 31F, and its corresponding triggers for the other four columns, to simultaneously record the condition of the cells of its associated column as the row of cells is read, and to enable re-writing of that condition into the same cell to take place immediately via the gate and amplifier of that column, such as 3G1 and 31W, respectively. However, such re-writing will only take place if the condition of the cell is "1," since should it be at "0," no output from the column output wire will appear at the output amplifier, such as 31R, and the trigger will remain conducting in the "0" position. Thus the condition of the trigger is the same as that of the cell in either case.

It is also the purpose of triggers 31F to 35F, in association with start trigger 30F and common control equipment, comprising trigger 36F, and counter 3C, to transfer the conditions of the five code elements for the decimal number "units" digit to triggers 41F to 45F, respectively and further to transfer conditions of those code elements for the decimal number "tens" and "hundreds" digit to triggers 51F to 55F and 61F to 65F respectively, where they are held until such times as they are required to be withdrawn either in serial or parallel form for transfer to some other storage medium, such as a shift register or magnetic drum. Such a withdrawal must take place during the cycle of the access selector in which translation is taking place or before the commencement of the next cycle.

Figure 2:
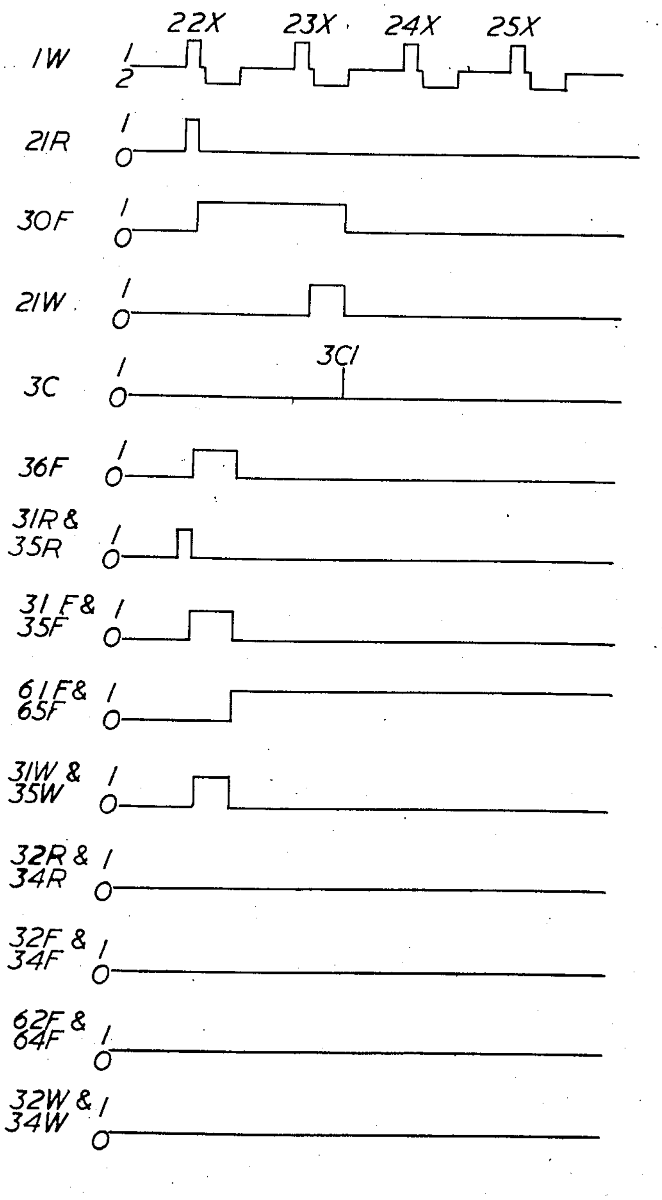
FIG. 2 is a diagram of the time scale and waveforms at various points in the circuit during a translation procedure.

Translation of a decimal number to a five element telegraph code will now be described in greater detail with reference to FIGS. 1 and 2, wherein FIG. 2 shows a time scale of the events during translation of the "hundreds" digit when such a digit is 2 and its five element telegraph code is "10001." Referring to FIG. 1, in the initial or rest conditions all triggers associated with each of the five columns are in the "0" condition; similarly, trigger 30F common to all columns is in the same condition. Counter 3C rests in position 3C1; stepping of this counter takes places on the appearance of condition 30F1, FIG. 1, which denotes that either a "unit," "tens" or "hundreds" digit has been read from column 21 of the counter. In this particular example it could be considered that the next serial number to be indicated is 231, i.e. a "1" condition will be read from the cells on "units" row "1X," "tens" row "13X," and "hundreds" row "22X" during the access selector cycle. On the commencement of the access selector cycle and when row "0X" is being scanned, nothing is read from Column 21, since the next "units" digit to be indicated is 1, and this condition is stored in a cell of Column 21 on row "1X." At the same time as half-read pulses 1W1 are being applied to row "0X" and the column wire of Column 21, they are also applied over the same row wire and to the five columns wires of the five cells in the transmitting matrix, the conditions of these cells being indicative of the elements of a telegraph code for "zero" or "0." Where any of the five cells are in the "1" condition reading will take place at pulse 1W1 and cause the associated amplifiers, which may be any of 31R to 35R to conduct via the output conductors and in consequence give an output, such as 31R, to the associated trigger such as 31F which conducts at 31f1. This condition appears at a gate such as 3G1 leading to writing amplifier 31W and to a gate such as 3G2. On the following half-write pulse 1W2 the "1" read from the cell is re-written back into the same cell; and at the end of the pulse 31f0 is reset. Where any of the five cells are in a "0" condition no such reading takes place, therefore the associated trigger such as 31F remains conducting at 31f0, hence the conditions of the five cells continue to indicate the particular five element telegraph code for "zero" after the read-write/cycle.

Since the reading and re-writing of the five elements of the telegraph code from, and back into, the cells of the particular row which is being scanned takes place simultaneously, and since the action of the triggers associated with each column are the same in operation, and carry out the same functions; it is only necessary to describe the action of triggers 31F, 41F, 51F and 61F associated with the cells in column 31 in which the *first* elements of the telegraph code digits are stored for digits "0" to "9" i.e. "0" in row "0X" to "9" in row "9X"; the remaining four elements of the code are stored in the cells of the same row of the other four columns i.e. columns 32, 33, 34, and 35. When row "1X" is being scanned a "1" condition is read from column 21 of the counter and is indicative of the "units" value of the serial number which in this case is 1.

Reading amplifier 21R will therefore conduct causing 21r to appear at trigger 30F which in turn conducts at 30f1. 30f1 appears at counter 3C and prepares its stepping circuit. 31r also appears at trigger 36F which conducts at 36f1, this condition appears at gate 3G4 leading to trigger 41F with 3C1. If 31f1 is conducting through "1" being read from the cell in row "1X" of column 31 of the counter, this condition being indicative of the first element of the five unit code for 1, 31f1 will appear also at gate 3G4 and trigger 41f1 will conduct when 31F resets. Hence the condition of the first element is registered in this trigger. Similarly, if the condition of the cells of the same row in the four remaining columns, and indicating the condition of the other four elements of the telegraph code for 1, were in the "1" condition; operation of their respective reading amplifiers would take place, and their respective triggers corresponding to trigger 31F and 41F would in turn be triggered to the "1" position. However the five element code for the particular units digit might be 11101 and therefore only triggers 31F, 32F, 33F and 35F would conduct at their "1" positions followed by 41F, 42F, 43F and 45F respectively; triggers 34F and 44F would remain conducting at 34f0 and 44f0. The conditions now registered in triggers 41F to 45F and which are indicative of the telegraph code elements for a "units" value of 1 could now be withdrawn immediately if required, or at some time before the commencement of the next scanning cycle of the access selector. Where such triggers of this group are in a "1" position, re-setting to the "0" condition takes place after withdrawal by conditions "XP" appearing. This condition is indicative of an external pulse from the forward storage or registering equipment (not shown) which indicates that withdrawal has taken place. Condition 31f1 has also appeared at gate 3G1 and on half-write pulse 1W2, the "1" condition read from column 31 is re-written in the cell of the row from whence it came. Similarly conditions 32f1, 33f1 and 35f1 would have appeared at the corresponding gates to their respective columns and the condition read would therefore be rewritten into cells of the same row in their respective columns. Since the condition in the cells of column 34 was "0" and nothing was read therefrom, there is no requirement to write back into that cell. Triggers 31F, 32F, 33F and 35F will be re-set to their "0" positions on pulse 1W2 by the appearance of conditions, such as 31f1, at their respective gates, such as 3G2. Trigger 36F is re-set to 36f0 on the same 1W2 pulse by its appearance with 36f1 at gate 3G3. 30f1 will remain conducting during two 1W2 pulses and then 30f0 will conduct again. The latter allows 3C to step from 3C1 to 3C2. The scanning cycle of the access selector continues, and as each succeeding row of five cells in the translating matrix are scanned, the conditions therein, if they are in a "1" condition, are re-written via their respective writing amplifiers, such as 31W, whilst if they are in a "0" condition no change or re-writing takes place. When reading amplifier 21R of Column 21 of the counter circuits again conducts through "1" being read from column 21 on row "13X" which indicates the serial number "tens" digit which in this case will be 3, 21r appears and 30f1 conducts, and 21r also appears at trigger 36F which conducts at 36f1. This condition appears also at gate 3G5 to trigger 51F with 3C2. If in this instance 31f1 is conducting through a "1" condition being read from the cell in row "13X" of column 31, 31f1 will also appear at gate 3G5 and 51f1 conducts. Hence the condition of the first element of the five element code indicative of the decimal number "tens" digit is registered in this trigger. Again, as in the case of registration of the conditions of the "units" elements in triggers 42F to 45F, if the conditions of the cells in the remaining four columns of row "13X" were in a "1" condition, operation of their respective reading amplifiers such as 31R would take place, and their respective triggers corresponding to 31F and 51F would in turn be triggered to the "1" condition. If however, and as explained previously, the five digit code for the "tens" value of the serial number was 11001, only triggers 31F, 32F, and 35F would be triggered to the "1" condition as would in consequence their associated triggers 51F, 52F and 55F. Triggers 33F and 34F and their associated triggers 53F and 54F would remain at "0." The conditions registered in triggers 51F to 55F are now indicative of the five elements of the "tens" digit of the decimal number and may be withdrawn in a like manner to those held in triggers 41F to 45F. Again, and as described with respect to the "units" digit registration, triggers such as 31F, which are conducting at their "1" positions, are re-set to their "0" positions on pulse 1W2, and the condition is re-written in the cells of the row from whence they were "read," other triggers in the "0" condition being unaffected, as are the cells of the columns of that particular row with which the triggers are associated. Trigger 36F is re-set to 36f0 as before. 3C steps to 3C3.

Finally, as row "22X" is being scanned and as a "1" is read from that row in column 31 and which is indicative of the decimal number "hundreds" digit, in this case 2, reading amplifier 21R again conducts and in consequence 21r causes 30f1 to conduct. 21r also appears at trigger 36F which conducts at 36f1, this condition appearing at gate 3G6 to trigger 61F with 3C3. In this instance, as in previous operations of 21R, if 31f1 conducts through a "1" condition being read from the cell in row "22X" of column 31, 31f1 will appear at gate 3G6 to trigger 61F to conduct at 61f1. Hence the condition of the first element of the five elements indicative of the decimal number "hundreds" digit is registered in this trigger. If the condition of the cells in the remaining four columns of the row "22X" were in a "1" condition, operation of their respective reading amplifiers, such as 31R, would take place and their respective triggers corresponding to 31F and 61F would in turn be triggered to the "1" condition. Again in this case, if the five digit code for the "hundreds" value of the serial number was 10001 only triggers 31F and 35F would be triggered to the "1" condition, as would in consequence 61F and 65F. Triggers 32F, 33F, 34F and their associated triggers 62F, 63F 64F would remain at "0."

The conditions row registered in triggers 61F to 65F are now indicative of the five elements of the "hundreds" digit value of the decimal number and may be withdrawn in a like manner as the elements previously stored in triggers 41F to 45F and 51F to 55F for the "units" and "tens" digit values respectively. It will be seen that this withdrawal may take place in any order, i.e. "units," "tens," "hundreds" or "hundreds," "tens" and "units" at any time before commencement of the next access selector cycle which commences on a counting pulse appearing at the counter circuits. Immediately withdrawal has taken place, triggers 41F to 45F, 51F to 55F and 61F to 65F are reset to their "0" positions by the appearance of the exterior pulse "XP" from the forward storage medium. Triggers 31F to 35F and 36F are reset to their "0" positions as previously described, and counter 3C steps to position 3C1.

In certain circumstances it might be necessary to translate the number into more than one code and it will be apparent that this could be accomplished quite easily by adding groups of extra columns such as 31 to 35 of greater or lesser number per group dependent on the number of elements per "digit" of the particular code. The rows of cells of such additional groups would be threaded by the rows wires of corresponding rows of cells of other groups. Thus all rows of all groups would be scanned simultaneously by the common scanning equipment. The columns of each group would have, of course, their own reading and writing amplifiers, and common equipment, together with their own particular triggers for the purposes already described with regard to recording, transfer, and storage. Whilst equipment for the coding of a three "digit" number has been described, numbers with more than three "digits" could be translated by the addition of extra storage triggers per column. One more per each extra digit, and one extra position of counter 3C per each extra digit, since the counter constituted by column 21 and its appendent control equipment can be designed to operate with extra groups of cells for additional decades.

While the principles of the invention have been described above in connection with specific embodiments, and particular modifications thereof, it is to be clearly understood that this description if made only by way of example and not as a limitation on the scope of the invention.

What we claim is:

1. A coder for issuing any one of a number of codes, each code of which corresponds to a predetermined item of intelligence comprising a plurality of code stores in coordinate array, the number of stores in a row being equal to the number of elements in the code, certain of said stores in each row being in a predetermined condition in accordance with the elements of the code, the corresponding stores in each row constituting a column and the number of columns being equal in number to the number of stores in a row, an output wire for each column, row selecting means comprising a plurality of stores equal in number to the number of rows in said coordinate array of stores and including common row wires adapted to have predetermined potentials selectively applied thereto, first reading means for selectively reading a store of said selecting means when said predetermined potential has been applied to the row wire thereof, second reading means for simultaneously reading the corresponding row of code stores in said array and producing a signal on the associated output wires indicative of the condition of the corresponding stores in said row, a plurality of output circuits, there being one for each column of said array, and means responsive to a signal from said first reading means for simultaneously connecting said output wires respectively with said output circuits, whereby the code recorded in said selected row of code stores is applied to said output circuits.

2. A coder, as defined in claim 1, further comprising additional row selecting means comprising a plurality of stores equal in number to the number of rows in the coordinate array of stores and multipled to the stores of the first mentioned row selecting means, the first reading means being common to both, an additional set of output wires, switching means controlled by said first reading means for switching the connections of the output wires from the first output circuits to said additional output circuits in response to a second operation of said first reading means.

3. A "ferric" coder for issuing any one of a number of codes, each code of which corresponds to a predetermined item of intelligence comprising a plurality of code stores in co-ordinate array, each store comprising a "ferric" cell, the number of cells in each row equal in number to the number of elements in the code, certain of said cells in a row being in a predetermined condition in accordance with the elements of the code, and wherein the corresponding cells in each row constitute a column, said columns equal in number of said cells in a row, a row wire per row, a column wire and an output wire per column, writing equipment per column wire, reading equipment per output wire, said writing and reading equipments comprising means for simultaneously applying half-read pulses of one polarity to said column wires followed by half-write pulses of the opposite polarity, whereby when a row wire is energized, a half-read pulse applied to a colunm wire will cause a signal to appear on the associated output wire if the "ferric" cell through which that row wire and that column wire pass is in one condition of saturation, control equipment common to all columns of cells, recording equipment individual to each column of cells and connected with said reading and writing equipment of the column, means controlled by said recording equipment of a column for causing the writing equipment of said column to respond to a half-write pulse following a half-read pulse which has caused intelligence from a "ferric" cell to be recorded in said recording equipment and to write said intelligence into said same "ferric" cell, a plurality of storage equipments per column of cells, counting means in said common control equipment responsive to the number of operations thereof for selecting one of said storage equipments, and means enabled by said control equipment for transferring intelligence stored in said recording equipment to the selected one of said storage equipments.

4. A "ferric" coder as defined in claim 3, in which the common control equipment comprises a first bistable device, means for causing the counter to advance one step when said first bistable device shifts from one stable conditions to the other, a second bistable device, and means for selecting a row of "ferric" cells to be read and simultaneously shifting said first bistable device from said one stable condition to the other and said second bistable device from one stable condition to the other, and in which the means for transferring intelligence from the recording equipment to the storage equipment comprises coincidence gates under control of said second bistable device, said counter, and said recording equipment.

5. A "ferric" coder, as defined in claim 3, in which the recording equipment comprises a bistable device for each column of cells, means for causing said device to assume one condition of operation when intelligence is read from a cell in the associated column, means for enabling the writing equipment for the associated column when said bistable device is in said one condition, and means responsive to a half-write pulse when said bistable device is in said one condition for causing said bistable device to assume its other condition.

References Cited in the file of this patent

UNITED STATES PATENTS

| | | |
|---|---|---|
| 2,719,965 | Person | Oct. 4, 1955 |
| 2,750,580 | Rabenda | June 12, 1956 |